US007428332B2

(12) United States Patent
Spaulding et al.

(10) Patent No.: US 7,428,332 B2
(45) Date of Patent: Sep. 23, 2008

(54) APPLYING AN ADJUSTED IMAGE ENHANCEMENT ALGORITHM TO A DIGITAL IMAGE

(76) Inventors: Kevin E. Spaulding, Eastman Kodak Company, 343 State St., Rochester, NY (US) 14650-2201; Raymond W. Ptucha, Eastman Kodak Company, 343 State St., Rochester, NY (US) 14650-2201; Edward B. Gindele, Eastman Kodak Company, 343 State St., Rochester, NY (US) 14650-2201; Andrew C. Gallagher, Eastman Kodak Company, 343 State St., Rochester, NY (US) 14650-2201

(*) Notice: Subject to any disclaimer, the term of this patent is extended or adjusted under 35 U.S.C. 154(b) by 692 days.

(21) Appl. No.: 10/757,055

(22) Filed: Jan. 14, 2004

(65) Prior Publication Data

US 2005/0152612 A1 Jul. 14, 2005

(51) Int. Cl.
*G06K 9/00* (2006.01)
*G06K 9/40* (2006.01)
(52) U.S. Cl. .................. 382/167; 382/254; 382/162
(58) Field of Classification Search ............ 382/254, 382/162
See application file for complete search history.

(56) References Cited

U.S. PATENT DOCUMENTS

| 5,185,666 A * | 2/1993 | Capitan et al. ............. 348/588 |
| 5,321,500 A * | 6/1994 | Capitan et al. ............. 348/97 |
| 2002/0067518 A1* | 6/2002 | Benz et al. ................. 358/518 |
| 2003/0002095 A1* | 1/2003 | Gruzdev et al. ............. 358/518 |

OTHER PUBLICATIONS

"Color Image Processing Using an Image State Architecture" by Geoffrey J. Woolfe et al., 9th Congress of the International Colour Association, Proceedings of SPIE vol. 4421 (2002), pp. 467-470.

* cited by examiner

*Primary Examiner*—Jingge Wu
*Assistant Examiner*—Max Shikhman
(74) *Attorney, Agent, or Firm*—Raymond L. Owens

(57) ABSTRACT

A method is described for applying an image enhancement algorithm to input digital images represented in different input color spaces including identifying the input color space of an input digital image, and applying a color space transformation to the input digital image represented in the input color space to form a corresponding input digital image in a reference color space. The method also includes adjusting one or more algorithm parameters of the image enhancement algorithm in response to the identified input color space, and applying the image enhancement algorithm with the one or more adjusted algorithm parameters to the corresponding input digital image in the reference color space to produce an enhanced digital image in the reference color space.

27 Claims, 2 Drawing Sheets

APPLYING AN ADJUSTED IMAGE ENHANCEMENT ALGORITHM TO A DIGITAL IMAGE

FIELD OF THE INVENTION

The present invention pertains to the field of digital image processing, and more particularly to the field of applying image enhancement algorithms to input digital images in a variety of input color spaces.

BACKGROUND OF THE INVENTION

The use of image enhancement algorithms is well known in the field of digital imaging. Examples of common image enhancement algorithms that are used in various applications include exposure adjustment, tone scale adjustment, color adjustment, sharpening, noise reduction, and red-eye correction. Typically these algorithms are designed to take as input an input digital image in some input color space, and produce a modified output digital image in that same color space. There are many different color spaces that are used in digital imaging systems for various applications. These would include various standard device-independent color spaces, e.g. the well known sRGB, CIE XYZ and CIELAB color spaces, as well as device-dependent color spaces that are associated with a particular input or output device, e.g. scanner RGB, raw digital camera RGB, video RGB, printer CMY(K), etc. Unfortunately, many image enhancement algorithms behave quite differently depending on the color space that the image is in. For example, an image enhancement algorithm designed to correct "red-eye" artifacts that are often encountered in images captured using an electronic flash will typically include a step of detecting the red eyes. But since the particular code values that would be typical of a red-eye will be quite different depending on the color space in which the image is represented, detection of the red eyes will generally be color space dependent. As a result, it is often necessary to develop custom versions of each algorithm in order to achieve the desired results in each color space. This is illustrated in FIG. 1 which shows an input digital image in a first color space 10 being processed using an image enhancement algorithm adapted for the first color space 12 to produce an output digital image in the first color space 14. To apply an analogous image enhancement algorithm to an input digital image in a second color space 11, it is necessary to use an image enhancement algorithm adapted for the second color space 13, producing an output digital image in the second color space 15. The fact that the image enhancement algorithm must be rewritten, or at least reoptimized, for each color space of interest is a significant disadvantage of this approach.

To overcome the disadvantages associated with needing to develop different versions of each image enhancement algorithm for each different color space, another approach has been proposed which involves transforming all of the input images in the different input color spaces to a single reference color space, or a small number of reference color spaces, where a single version of the image enhancement algorithms can be applied, for example, as shown in G. J. Woolfe and K. E. Spaulding, "Color image processing using an image state architecture," in *9th Congress of the International Colour Association*, 442-444 (2001). This approach is illustrated in FIG. 2. A transform image to reference color space step 16 is used to transform the input digital images in the various input color spaces to a common reference color space producing an input digital image in the reference color space 17. A common version of the image enhancement algorithm adapted for the reference color space 18 can then be applied to the digital image to produce an output digital image in the reference color space 19. Using this approach, each image enhancement algorithm only needs to be developed and optimized for a single reference color space, or at most a small number of reference color spaces. This provides a significant advantage over the method shown in FIG. 1.

However, the approach show in FIG. 2 has the disadvantage that the performance of the image enhancement algorithms can sometimes be disadvantaged relative to that which can be achieved using a version of the image enhancement algorithm that is specially optimized for a particular color space. For example, it will generally be desirable to use an extended-color-gamut color space for the reference color encoding in order to avoid limiting the range of colors that can be retained through the imaging chain. Examples of such extended-color-gamut color spaces that are well known in the art include CIELAB, ROMM RGB, (E)RIMM RGB, sYCC, bg-sRGB and scRGB. If the input digital image is in a limited-color-gamut color space, such as the standard display-ready sRGB color space, then the transform image to reference color space step 16 will produce input digital images in the reference color space 17 where the color values that are outside the color gamut of the input color space are never used. Since the image enhancement algorithm adapted for the reference color space 18 must be designed to work with images that originated in any input color space, it can be necessary to make compromises in the design of the algorithm that would not be necessary if it were being optimized for one particular input color space. In the present example, it would not be known what the color gamut of the input color space was; therefore, it would not be possible to optimize a color enhancement algorithm so that it did the best job possible for the color values that were within the color gamut of the particular input color space. Thus, while there are significant system architecture advantages to the method shown in FIG. 2, it will be disadvantaged relative to the method shown in FIG. 1 for cases where it is desired to produce the absolute highest possible image quality.

SUMMARY OF THE INVENTION

It is an object of the present invention to overcome the limitations of the prior art and provide an enhanced output image when an input digital image has been converted to a reference color space.

These objects are achieved by a method for applying an image enhancement algorithm to input digital images represented in different input color spaces comprising:

a) identifying the input color space of an input digital image;

b) applying a color space transformation to the input digital image represented in the input color space to form a corresponding input digital image in a reference color space;

c) adjusting one or more algorithm parameters of the image enhancement algorithm in response to the identified input color space; and d) applying the image enhancement algorithm with the one or more adjusted algorithm parameters to the corresponding input digital image in the reference color space to produce an enhanced digital image in the reference color space.

ADVANTAGES

The present invention provides a way for converting input digital images to a common reference color space and for adjusting parameters of an image enhancement algorithm, or selecting different versions of an image enhancement algorithm based on the input color space of the input digital image, so as to produce an enhanced digital image. An advantage of the invention is that improved results can be obtained for input digital images in different input color spaces, while maintaining the desirable features of using a common reference color space.

DETAILED DESCRIPTION OF THE INVENTION

Figure 1:
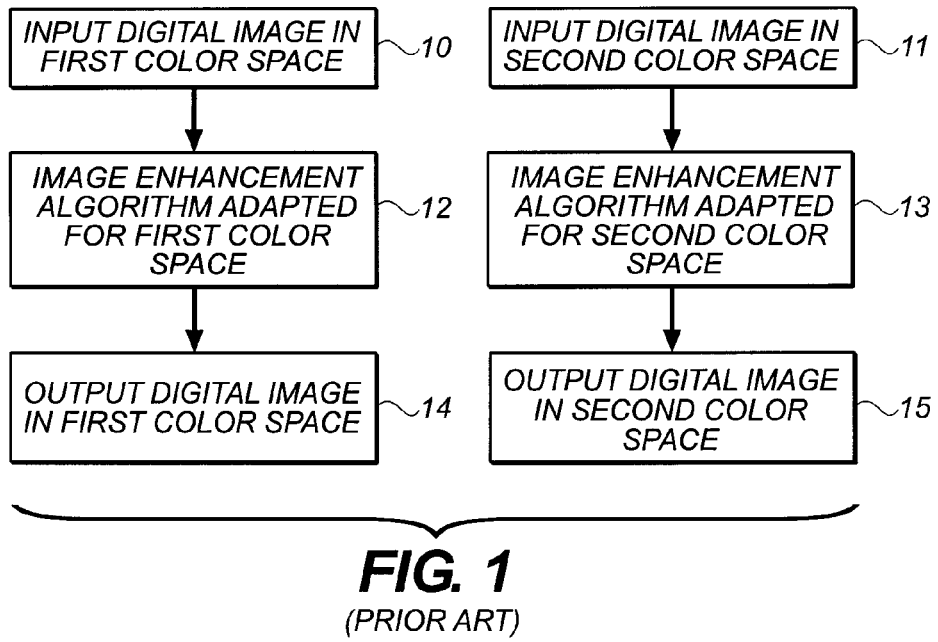
FIG. 1 is prior art method for applying an image enhancement algorithm to images in a variety of input color spaces.
Figure 2:
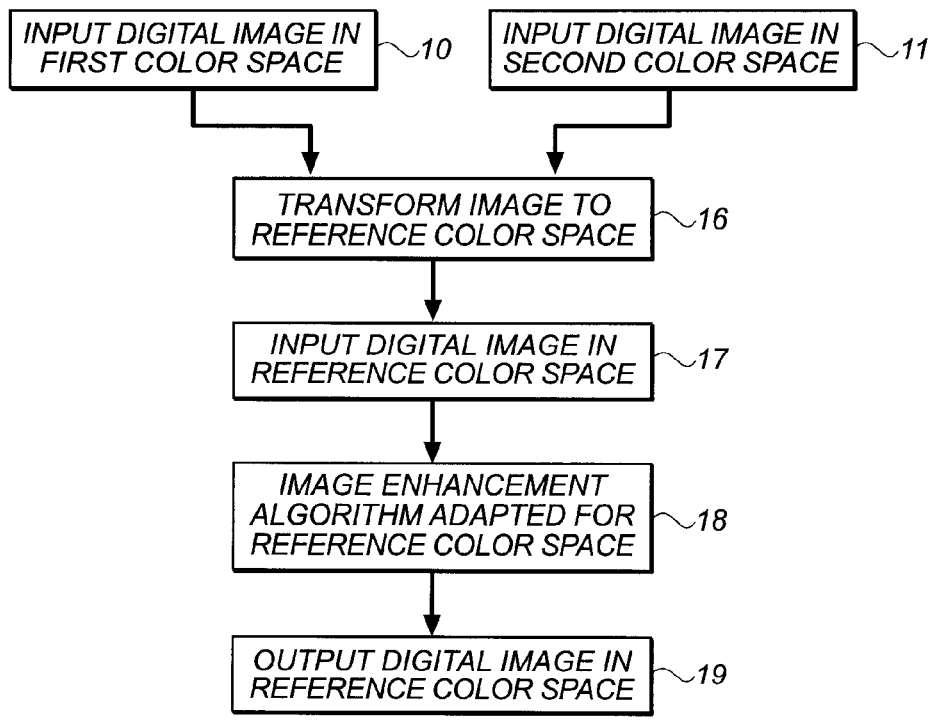
FIG. 2 is another prior art method for applying an image enhancement algorithm to images in a variety of input color spaces.
Figure 3:
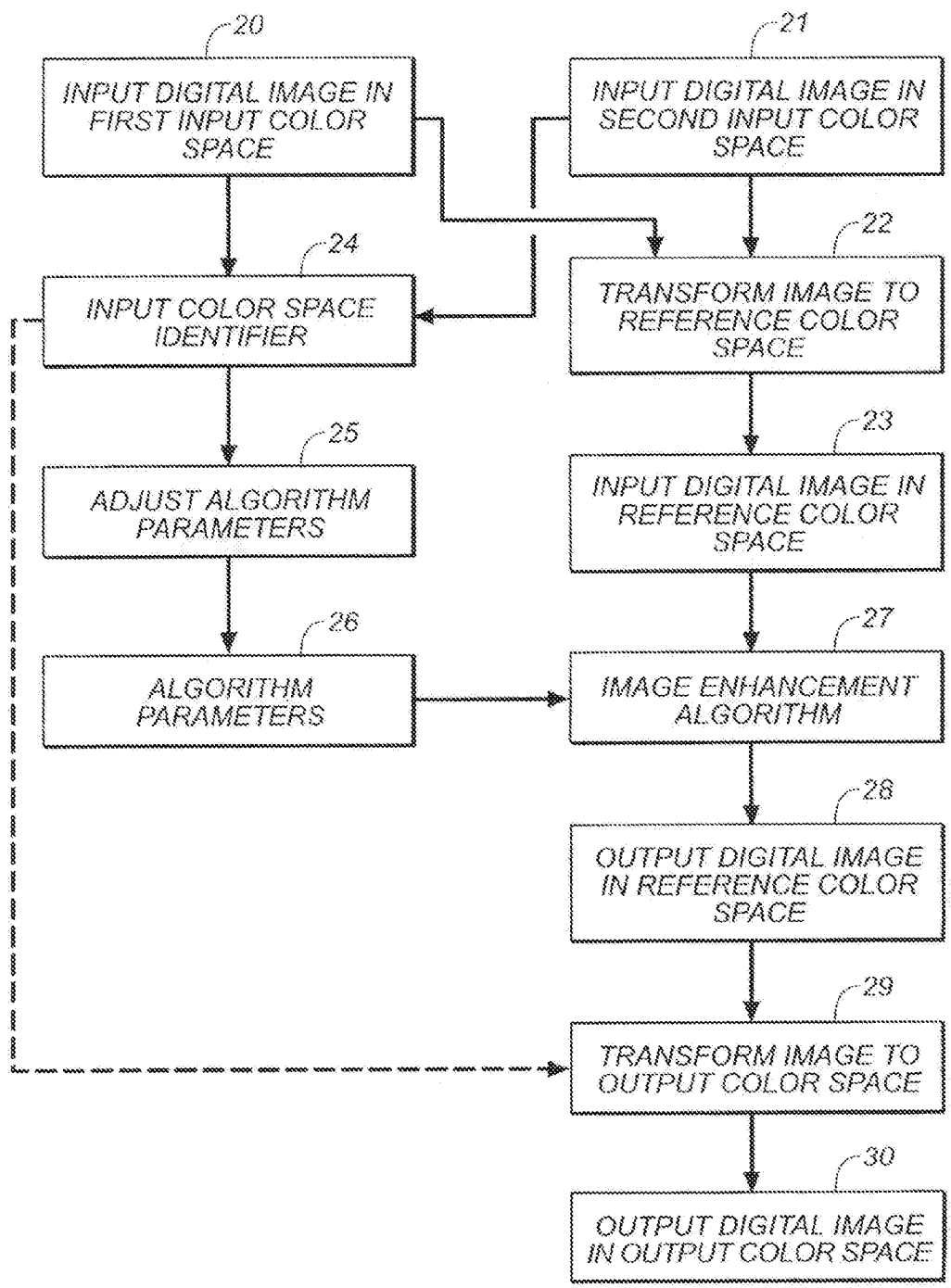
FIG. 3 is a flow diagram illustrating the method of the present invention.

This invention represents a way for applying an image enhancement algorithm to images that exist in a plurality of different input color spaces. Referring to FIG. 3, a flow diagram illustrating a preferred embodiment of the present invention is shown. For this example, input digital images in two different input color spaces are illustrated (input digital image in first input color space 20 and input digital image in second input color space 21), but the method can be generalized to work with any number of different input color spaces. A transform image to reference color space step 22 is used to transform the input digital image from the input color space to a reference color space, forming an input digital image in reference color space 23. An input color space identifier 24 is defined to identify the original input color space of the input digital image. An adjust algorithm parameters step 25 is used to vary one or more algorithm parameters 26 responsive to the input color space identifier 24. An image enhancement algorithm 27 is applied to the input digital image in the reference color space 23 to form an output digital image in reference color space 28, where the behavior of the image enhancement algorithm 27 is modified according to the one or more algorithm parameters 26. Optionally, a transform image to output color space step 29 can be used to transform the output digital image in reference color space 28 to form an output digital image in output color space 30. In some cases, it can be desirable to have the output color space be the same as the input color space. In this case, the input color space identifier 24 can be used by the transform image to output color space step 29 to select an appropriate color space transformation as shown by the dashed line.

The various features of the present invention will now be discussed in more detail. There are many different input color spaces that can be encountered in various digital imaging applications. One of the most common color spaces that is used to store and interchange digital images is the well known sRGB color space, which is a standard display-ready video RGB color space. Other well known standard color spaces that can be encountered in various applications include sYCC, CIE XYZ, CIELAB, ROMM RGB, (E)RIMM RGB, SWOP CMYK and Status M densities. Additionally, it is also common for input digital images to be encountered in various device-dependent color spaces that are associated with the code values for particular input or output device, e.g. scanner RGB, raw digital camera RGB, video RGB, printer CMY(K), etc. Many input color spaces will have a limited color gamut, often limited by the characteristics of an associated imaging device. For example, the sRGB color gamut is limited to the colors that can be displayed on a reference CRT display.

There are many appropriate candidates found in the literature that can be used as the reference color space. In many applications, it will be desirable to use an extended-color-gamut color space for the reference color encoding in order to avoid limiting the range of colors that can be retained through the imaging chain. Examples of such extended-color-gamut color spaces that are well known in the art include CIELAB, ROMM RGB, (E)RIMM RGB, sYCC, bg-sRGB, and scRGB. When selecting an appropriate reference color space for a particular application, a number of factors should be considered including the size of the color gamut, the size of color quantization errors, complexity of transforms to/from the color space, and whether it is well suited for the application of the relevant image enhancement algorithms (K. E. Spaulding, "Image states and standard extended gamut color encodings," in *Proceedings of the CIE Expert Symposium 2000 on Extended Range Colour Spaces*, 59-70, CIE x021: 2001).

Depending on the particular input color space and reference color space, the complexity of the transform image to reference color space step 22 can vary greatly. For example, if the input color space were sRGB and the reference color space were ROMM RGB, a simple color transformation including a one-dimensional look-up table (1-D LUT), followed by a 3×3 matrix, followed by another 1-D LUT can be used (ANSI/I3A IT10.7666 Electronic Still Picture Imaging—Reference output medium metric RGB color encoding (ROMM-RGB).

On the other hand, if the reference color encoding in this example were ERIMM RGB, the color transformation can be somewhat more complex. Since sRGB is an encoding of "rendered" picture colors intended for display on a video display, and ERIMM RGB is intended for encoding colors in an original scene, an sRGB-to-ERIMM RGB transformation would need to include an "inverse color adjustment function" that substantially undoes the "color adjustment function" that was applied sometime in the life cycle of the sRGB image. The "color adjustment function" is a color and tone transformation relating the original scene colorimetry to the colors appropriate for display on the reference video display. Since the rendering process typically involves throwing away extended-dynamic-range and extended-color-gamut portions of the scene data, an exact inverse rendering is not generally possible. In some cases, such inverse rendering functions can introduce significant artifacts. Gallagher et al. have discussed a method for reducing these image artifacts in U.S. Patent Application Publication 2003/0223634 A1 published Dec. 4, 2003 by Gallagher et al., entitled "Method for Constructing an Extended Color Gamut Digital Image for a Limited Color Gamut Digital Image", the disclosure of which is herein incorporated by reference. With this method, the inverse color adjustment function is designed to produce input digital images in the reference color space having reduced highlight color saturation for highlight color values compared with corresponding original scene colors.

As another example, consider the case where the input color space is an encoding of the colors of a photographic negative (examples of such color spaces would include a Status M Density color encoding, or a "printing density" color encoding.) In this case, if the reference color space was an encoding of original scene colors (e.g., ERIMM RGB), it would be necessary for the color space transformation to include an inverse film sensitometry transformation that is used to estimate the original scene colors that would have produced a given color on the photographic negative. One method for implementing an inverse film sensitometry transformation, including the step of correcting for the nonlinearities in the response of photographic film, is described in U.S. Pat. No. 5,134,573 by Goodwin. This method uses the film $D_{min}$ to apply a nonlinear correction by first shifting each channel of the digital color image by an amount such that actual $D_{min}$ values match standard $D_{min}$ values and then applying the nonlinear correction to extend the linear range of the photographic film.

Similarly, if the input color space is an encoding of the colors of a photographic negative, and the reference color space was an encoding of output picture colors (e.g., ROMM RGB) it would be necessary for the color space transformation to include a film rendering transform to map the photographic negative colors to the desired output picture colors. Such a film rendering transform could be designed to simulate the response of a conventional optical color negative printing system, or could be designed to achieve some other tone/color reproduction characteristics.

The input color space identifier 24 is preferably a piece of digital "metadata" that is stored together with the input digital image in reference color space 23. The digital metadata can be stored as part of the non-image header data in a digital image file, or can be stored in some form of digital memory associated with the digital image. In a preferred embodiment of the present invention, a list of possible input color spaces can be tabulated, and the color space identifier 24 is simply an index into the tabulated list. For example, color space #1 might be sRGB, color space #2 might be ROMM RGB, etc. In other embodiments of the present invention, the color space identifier 24 could include a more complete description of the input color space. For example, an ICC color profile could be stored describing the relationship between the input color space and the well known ICC Profile Connection Space (PCS). Alternatively, the color space identifier could include information, such as a description of the color gamut of the input color space, that would be useful to the image enhancement algorithm.

The definition of the algorithm parameters 26, and therefore the form of the adjust algorithm parameters step 25, will be a function of the particular image enhancement algorithm 27. For example, if a tone scale enhancement algorithm has algorithm parameters 26 that specify the upper and lower bounds of the input image dynamic range, the color space identifier 24 can be used to adjust these algorithm parameters 26 according to the dynamic range of the input color space. These algorithm parameters could be used to adjust the shape of a tone scale adjustment look-up table, or to limit the amount of exposure adjustment that the algorithm could impose. Similarly, if the image enhancement algorithm 27 were a color enhancement algorithm, it will sometimes be useful to adjust the behavior of the algorithm, for example by applying a variable chroma boost parameter responsive to the color gamut of the input color space. Other types of image enhancement algorithms that are commonly used in digital imaging chains include noise-reduction algorithms and sharpening algorithms. In some cases, it will be desirable to adjust the algorithm behavior to account for differences in the quantization errors and/or noise characteristics associated with the images in the input color space.

In one embodiment of the present invention, the image enhancement algorithm 27 is a tone scale modification algorithm such as that described in commonly assigned U.S. patent application Ser. No. 10/246,856 filed Sep. 19, 2002 by Edward B. Gindele, entitled "Enhancing the Tonal Characteristics of Digital Images Using Inflection Points in a Tone Scale Function", the disclosure of which is herein incorporated by reference. In this case, one algorithm parameter 26 that relates to improving the visibility of highlight detail is $x_w$. The fidelity of highlight detail of an input digital image in a first input color space that is "rendered" (for example sRGB) is often limited by the color gamut and dynamic range of the color space. As a result, color banding and other artifacts can be produced if the tone scale modification algorithm is used to apply aggressive modifications to the highlight regions of the corresponding input digital image in the reference color space 23. The quality of highlight detail of an input digital image that is in a second color space which is an extended dynamic range encoding of original scene colors (e.g., ERIMM RGB) is far less likely to exhibit highlight artifacts when the tone scale modification algorithm is applied to the corresponding input digital image in the reference color space 23. For this reason, when the color space identifier 24 indicates that the input image was encoded in sRGB, then the parameter $x_w$ that is used for adjusting the highlight regions of the image tone scale is set to a larger value, for example a value greater than 1.0, permitting the tone scale adjustment algorithm to make only mild changes to the image highlights. While this limits the potential benefits of increasing the highlight visibility, it also limits the risks of increasing artifact visibility. However, when the color space identifier 24 indicates that the input image was encoded in ERIMM RGB, then the parameter $x_w$ that is used for adjusting the tone scale of the image is set to a smaller value, for example a value less than 1.0, permitting the tone scale adjustment algorithm to make larger modifications for increasing visibility of the image highlights without the risk of amplifying highlight artifacts. In this example, the adjusted algorithm parameters 26 are used to optimize the trade-off between improving the visibility of highlight detail while minimizing the visibility of highlight artifacts for each possible input image color space.

In some cases, the algorithm parameters 26 can be used to make continuous adjustments to the behavior of the image enhancement algorithm 27. For example, the algorithm parameters 26 can be used to adjust a contrast scale factor. In other cases, the algorithm parameters 26 can be used to turn certain components of the image algorithm "on" or "off." For example, it is appropriate to perform a color enhancement step to map a video RGB color gamut to a typical printer gamut if the input color space is a video RGB color space, but not for the case where the input color space is an extended-color-gamut color space.

As another example, consider the case where clipping occurs when an image is stored in a "rendered " color space such as sRGB that cannot adequately represent all colors present in the original scene. A de-clipping algorithm designed to repair some of the damage to the image quality caused by clipping is described in commonly assigned U.S. Patent Application Publication 2003/0223634 A1 published Dec. 4, 2003 by Gallagher et al., entitled "Method for Constructing an Extended Color Gamut Digital Image for a Limited Color Gamut Digital Image", the disclosure of which is herein incorporated by reference. When the color space identifier 24 indicates that the input image was encoded in sRGB, then a parameter APPLY_DECLIPPING is set to 1, indicating that the de-clipping algorithm is to be applied to the corresponding input digital image in the reference color space. However, when the color space identifier 24 indicates that the input image was encoded in ERIMM RGB, then the parameter APPLY_DECLIPPING is set to 0, indicating that the de-clipping algorithm is not to be applied to the corresponding input digital image in the reference color space because clipping is likely to not be a problem for the image.

The algorithm parameters 26 can also be used to select a particular image enhancement algorithm 27 from a set of available image enhancement algorithms. For example, there can be multiple versions of a tone scale enhancement algorithm that are optimized for input images that originate in different input color spaces. In this case, the algorithm parameters 26 can be used as a switch to select the corresponding version that is optimal for the particular input color space.

Another image enhancement algorithm that can be regulated in response to the input color metric is a noise reduction algorithm. The Sigma Filter, described by Jong-Sen Lee in "Digital Image Smoothing and the Sigma Filter", Computer Vision, Graphics, and Image Processing, Vol. 24, 1983, pp. 255-269 is such a noise reduction algorithm. Lee discloses a noise reduction filter that uses a non-linear pixel averaging technique sampled from a rectangular window about the center pixel. Pixels in the local neighborhood are either included or excluded from the numerical average on the basis of the absolute value difference between the pixel and the center pixel as compared with a threshold value. The Sigma Filter works well for image processing applications for which the dominant noise source is Gaussian additive noise. The degree of noise reduction achieved with the Sigma Filter can controlled by an algorithm parameter, i.e. the noise threshold value. This noise threshold value is preferably set to a value equal to twice the magnitude of the expected noise standard deviation.

Since many imaging devices exhibit a signal dependent noise magnitude, a table of noise threshold values can be used to improve the noise reduction processing. When removing noise from a particular pixel, the value of the particular pixel is used as an index into a table of noise threshold values that have been stored for processing input digital images. For example, when processing ERIMM RGB input digital images that originated from sRGB input color space digital images, a first table of noise threshold values is used. When processing ERIMM RGB input digital images that originated from Status M density input color space digital images, a second table of noise threshold values is used. The table of noise threshold values is another example of an algorithm parameter. The corresponding table of noise threshold values is used to process input digital images based on the input color space identifier 24.

Both of the above mentioned tables of noise threshold values are produced by the same process. A noise input digital image is acquired of a patch target image containing a series of spatially flat (no signal modulation) patches wherein each patch is characterized by a different surface reflection coefficient. The noise input digital image is then transformed to the reference color space ERIMM RGB in the manner described above to produce an input digital image in the reference color space. The standard deviation of the pixel values corresponding to each of the series of flat patch targets is measured from the input digital image in the reference color space. Each of these standard deviation values is used as an entry in the table of noise threshold values. Noise threshold values for other than the measured flat patch targets is generated by interpolating between the measured values.

The method of the present invention can also be applied for the case where multiple image enhancement algorithms 27 are applied to the input digital image in reference color space 23. For example, a digital imaging chain can include the sequential application of a noise-reduction algorithm, followed by a tone scale enhancement algorithm, followed by a color enhancement algorithm, followed by a sharpening algorithm. In this case, each of the multiple image enhancement algorithms 27 can have their own set of corresponding algorithm parameters 26, or they can share some of the parameters in common.

A computer program product having a computer readable storage medium can have a computer program stored thereon for performing all the steps of the present invention. The computer readable storage medium can comprise any physical device or medium employed to store a computer program including the examples mentioned earlier.

The invention has been described in detail with particular reference to certain preferred embodiments thereof, but it will be understood that variations and modifications can be effected within the spirit and scope of the invention.

PARTS LIST 10 input digital image in first color space
11 input digital image in second color space
12 image enhancement algorithm adapted for first color space
13 image enhancement algorithm adapted for second color space
14 output digital image in first color space
15 output digital image in second color space
16 transform image to reference color space step
17 input digital image in reference color space
18 image enhancement algorithm adapted for reference color space
19 output digital image in reference color space
20 input digital image in first input color space
21 input digital image in second input color space
22 transform image to reference color space step
23 input image in reference color space
24 input color space identifier
25 adjust algorithm parameters step
26 algorithm parameters
27 image enhancement algorithm
28 output digital image in reference color space
29 transform image to output color space step
30 output digital image in output color space

What is claimed is:

1. A method of applying an automatic image enhancement algorithm to an input digital image represented in an input color space, comprising:
   a) identifying the input color space of the input digital image;
   b) applying a color space transformation to the entire input digital image represented in the input color space to form a corresponding input digital image in a reference color space, which is different from the input color space;
   c) automatically adjusting one or more algorithm parameters of the automatic image enhancement algorithm in response to the identified input color space of the input digital image; and
   d) automatically applying the automatic image enhancement algorithm without user intervention using the one or more adjusted algorithm parameters to the entire corresponding input digital image in the reference color space to produce an enhanced digital image in the reference color space;
   wherein the adjustment of the automatic image enhancement algorithm is performed separate from and after the application of the color space transformation.

2. The method according to claim 1, wherein the reference color space is an extended color gamut color space.

3. The method according to claim 1, wherein the input color space is a limited color gamut color space.

4. The method according to claim 1, wherein the reference color space represents an estimate of the colors in an original scene.

5. The method according to claim 4, wherein the input color space represents the colors of a photographic negative, and the color space transformation is an inverse film sensitometry transformation.

6. The method according to claim 4, wherein the input collor space is a video RGB color space, and wherein the color space transformation is substantially an inverse of a color adjustment function used to map original scene colors to corresponding colors appropriate for display on a video display.

7. The method according to claim 6, wherein the inverse color adjustment function produces corresponding input digital images in the reference color space having reduced highlight color saturation for highlight color values compared with corresponding original scene colors.

8. The method according to claim 1, further including the step of applying an output color space transformation to the output digital image in the reference color space to form a corresponding output digital image in an output color space.

9. The method according to claim 8, wherein the output color space is the same as the input color space.

10. The method according to claim 1, wherein the automatic image enhancement algorithm is an adaptive tone scale enhancement algorithm.

11. The method according to claim 1, wherein the automatic image enhancement algorithm is a color enhancement algorithm.

12. The method according to claim 1, wherein the automatic image enhancement algorithm is a noise reduction algorithm.

13. The method according to claim 1, wherein the automatic image enhancement algorithm is a sharpening algorithm.

14. The method according to claim 1, wherein a sequence of automatic image enhancement algorithms are applied to the corresponding input digital image in the reference color space.

15. The method according to claim 1, wherein the one or more algorithm parameters control whether or not a component of the automatic image enhancement algorithm is applied.

16. A method of applying an automatic image enhancement algorithm to an input digital image represented in input color space, the method comprising:
 a) identifying the input color space of the input digital image;
 b) applying a color space transformation to the entire input digital image represented in the input color space to form a corresponding input digital image in a reference color space, which is different from the input color space;
 c) automatically selecting one version among a plurality versions of the automatic image enhancement algorithm according to the identified input color space; and
 d) automatically applying the selected version of the automatic image enhancement algorithm without user intervention to the entire corresponding input digital image in the reference color space to produce an enhanced digital image in the reference color space,
 wherein the selection of the automatic image enhancement algorithm is performed separate from and after the application of the color space transformation.

17. The method according to claim 16, where the reference color space is an extended color gamut color space.

18. The method according to claim 16, where the input color space is a limited color gamut color space.

19. The method according to claim 16, where the reference color space represents an estimate of the colors in an original scene.

20. The method according to claim 19, where the input color space represents the colors of a photographic negative, and the color space transformation is an inverse film sensitometry transformation.

21. The method according to claim 19, where the input color space is a video RGB color space, and wherein the color space transformation is substantially an inverse of a color adjustment function used to map original scene colors to corresponding colon appropriate for display on a video display.

22. The method according to claim 21, where the inverse color adjustment function produces corresponding input digital images in the reference color space having reduced highlight color saturation for highlight color values compared with corresponding original scene colors.

23. The method according to claim 16, further including the step of applying an output color space transformation to the output digital image in the reference color space to form a corresponding output digital image in an output color space.

24. The method according to claim 16, wherein the selected version of the automatic image enhancement algorithm is an adaptive tone scale enhancement algorithm.

25. The method according to claim 16, wherein the selected version of the automatic image enhancement algorithm is a color enhancement algorithm.

26. The method according to claim 16, wherein the selected version of the automatic image enhancement algorithm is a noise reduction algorithm.

27. The method according to claim 16, wherein the selected version of the automatic image enhancement algorithm is a sharpening algorithm.

* * * * *